United States Patent [19]

Klein

[11] 4,047,629
[45] Sept. 13, 1977

[54] SPARE TIRE HOIST AND SUPPORT

[76] Inventor: Darrel J. Klein, R.R. 1, Box 10, Breckenridge, Minn. 56520

[21] Appl. No.: 634,077

[22] Filed: Nov. 21, 1975

Related U.S. Application Data

[63] Continuation-in-part of Ser. No. 513,728, Oct. 10, 1974, abandoned.

[51] Int. Cl.$^2$ ............................................. B62D 43/04
[52] U.S. Cl. ................................. 214/451; 224/42.21
[58] Field of Search ............... 224/42.21, 42.06, 42.13, 224/42.14, 42.12, 42.2, 42.23, 42.24, 42.25, 29 R, 42.41, 42.46 R, 42.45 R; 214/451, 454, 453, 452

[56] References Cited

U.S. PATENT DOCUMENTS

| | | | |
|---|---|---|---|
| 3,223,263 | 12/1965 | Fielding | 214/454 |
| 3,494,493 | 2/1970 | Fowler | 214/454 |
| 3,648,867 | 3/1972 | Beavers | 214/454 |
| 3,785,518 | 1/1974 | Johnson | 214/454 |

Primary Examiner—Robert J. Spar
Assistant Examiner—Jerold M. Forsberg
Attorney, Agent, or Firm—James V. Harmon

[57] ABSTRACT

An apparatus is described for hoisting and storing a spare tire beneath the body of a vehicle. The apparatus comprises a supporting bar to which the tire is fastened and a pivotal connection between the bar and the vehicle. A reel is mounted upon the vehicle with a cable, rope or chain wound upon it and extending downwardly with a provision for connecting it when desired to the free end of the tire supporting bar so that the rotation of the reel will raise or lower the free end of the bar and the spare tire as the bar swings about the pivot. The supporting bar is entirely removable from the vehicle by means of a telescopic or sliding connection to enable the tire to be easily fastened to it. The supporting bar is provided with a rectangular cross section and is slidable upon a U-shaped channel which is self cleaning and prevents rotation of the tire thereby cooperating with the reel and the support at the free end of the rectangular tube to hold the tire securely in position when stored, and in a horizontal position while it is placed in and removed from storage.

3 Claims, 5 Drawing Figures

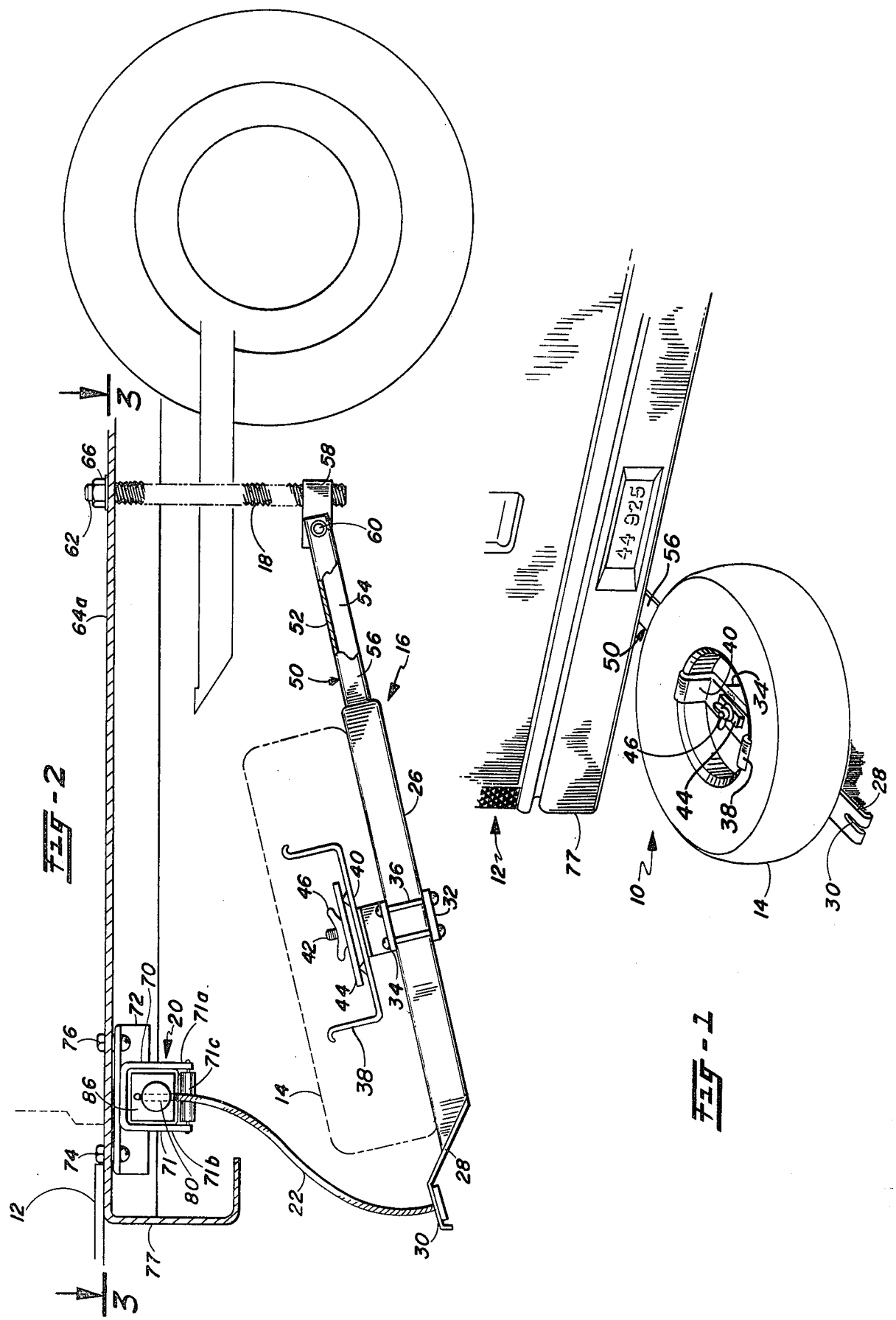

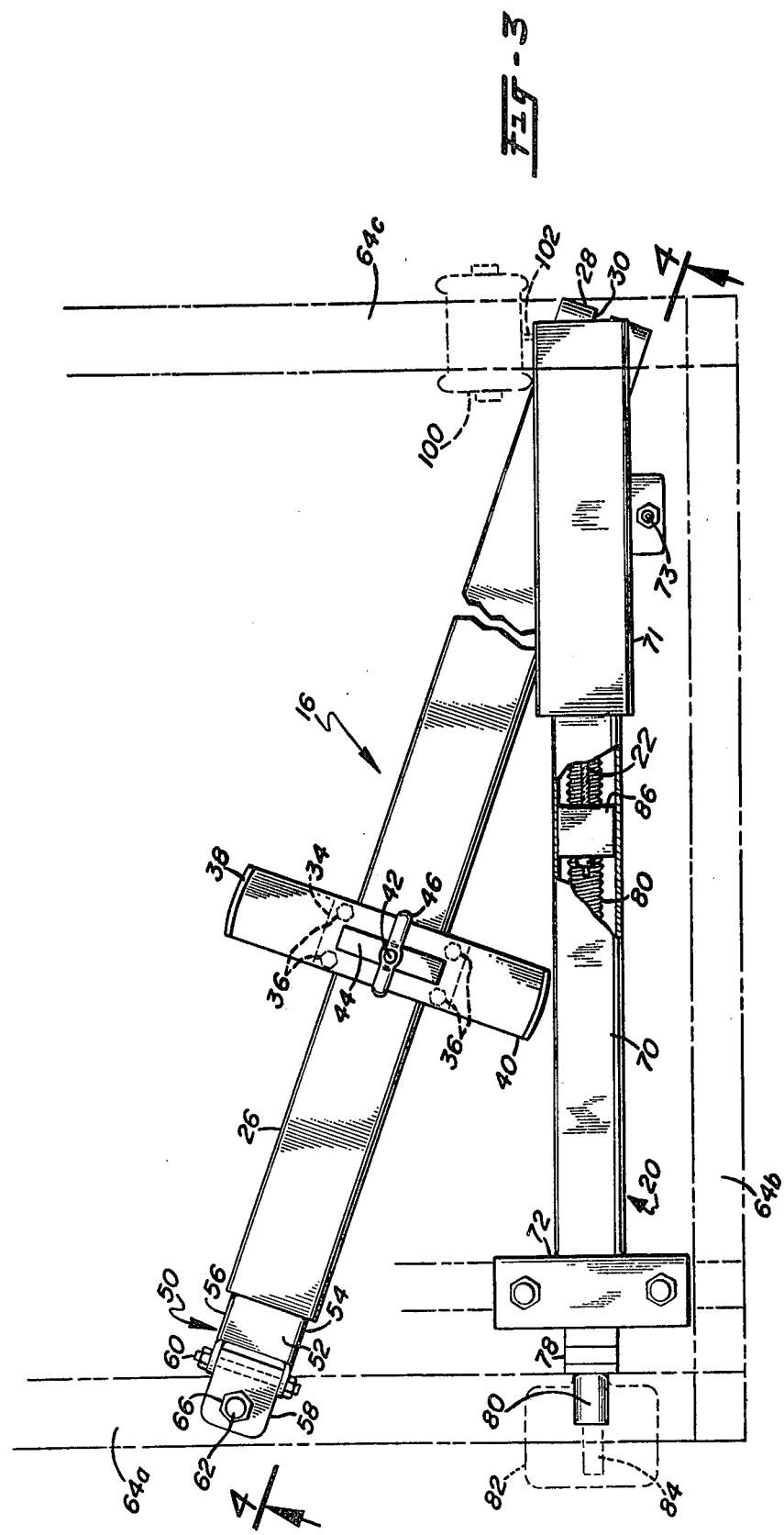

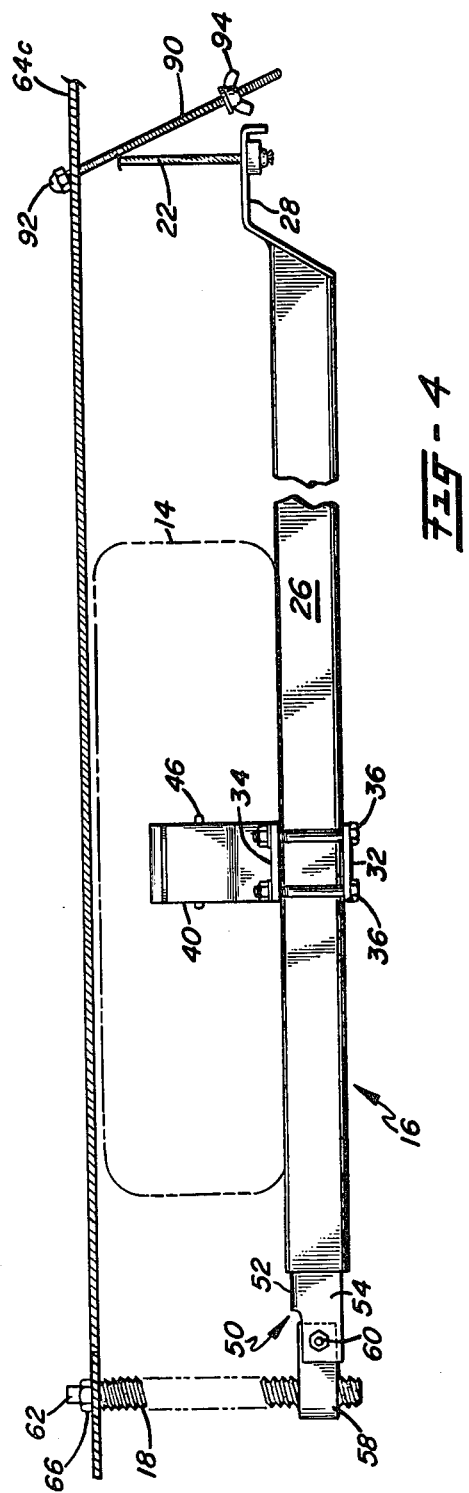

SPARE TIRE HOIST AND SUPPORT

This is a continuation-in-part of my prior application entitled "Klein-Away Tire Carrier" filed Oct. 10, 1974, Ser. No. 513,728, now abandoned.

FIELD OF THE INVENTION

The invention relates to automotive and truck accessories and more particularly to a spare tire hoist and storage assembly.

THE PRIOR ART

Many tire supports have been previously proposed for storing spare tires beneath a vehicle. These devices have three important requirements: first, to move the spare tire beneath the vehicle without moving the vehicle, second, to elevate the tire with the requirement for as little effort as possible and third, to hold the tire securely in place while in the stored position. The Beavers U.S. Pat. No. 3,648,867 discloses a spare tire support of the general type described but has certain disadvantages and shortcomings which make it inconvenient and cumbersome to use. In addition, lifting the bar that supports the tire requires a substantial physical effort which is very difficult or impossible when the tire must be changed by an adolescent, by a woman or other person without a great deal of physical strength. One feature of the present invention is the provision of a winch and cable connected to the free end of the bar to perform the lifting function. Even if an attempt were made to use such an arrangement with the Beaver's device, certain problems would be inherent in the design. The three part, telescoping tubing used as the support bar is expensive and tends to become clogged with mud or dirt. Because the rearward part cannot be removed completely, the tire must be fastened to it with the bar connected to the vehicle. This can be awkward and time consuming. In addition, the telescoping round tubing will not resist rotation and thus is less durable, more subject to damage and will not prevent the tire from rotating on the axis of the tube during the time it is being removed from or placed in storage. The consequent tilting of the tire one way or the other interferes with the operation.

THE OBJECTS

The major objects of the invention are to provide (a) an improved spare tire hoist and support which is rugged in construction, reliable in operation and requires very little physical effort to remove and replace the tire, (b) a provision for entirely removing the tire supporting bar so that the bar can be secured to the tire with the tire in any position, (c) a provision for preventing the tire from tilting and wobbling as it is being moved into position under the vehicle body or is being removed, (d) a provision which enables the tire to be mounted without going under the vehicle to remove the tire or driving the vehicle over the tire prior to replacing it in its stored position, (e) the provision of a tire supporting bar assembly which is unlikely to become clogged with dirt or mud and is self cleaning, (f) a provision for enabling the height of the tire mounting bar to be more quickly and easily changed to accommodate tires of different sizes, (g) the provision of either hydraulic, electric or manual operation of the tire elevating mechanism, (h) a provision for delivering the tire either straight out rearwardly from the vehicle, toward the side or in any other direction desired to facilitate removal and replacement of the spare tire.

THE FIGURES

FIG. 1 is a perspective view of the rear end of a pick-up truck with the tire in place on the tire support bar and the latter in an inclined position assumed when the bar is fully extended.

FIG. 2 is a vertical, longitudinal, sectional view through the rear portion of the vehicle on a slightly larger scale than in FIG. 1 with the tire supporting bar partially retracted but before being elevated to the tire storage position.

FIG. 3 is a horizontal partial sectional view of the rear end of the vehicle with the tire and its supporting bar in the stored position and taken on line 3—3 of FIG. 2.

FIG. 4 is a vertical sectional view taken on line 4—4 of FIG. 3.

SUMMARY OF THE INVENTION

Figure 5:
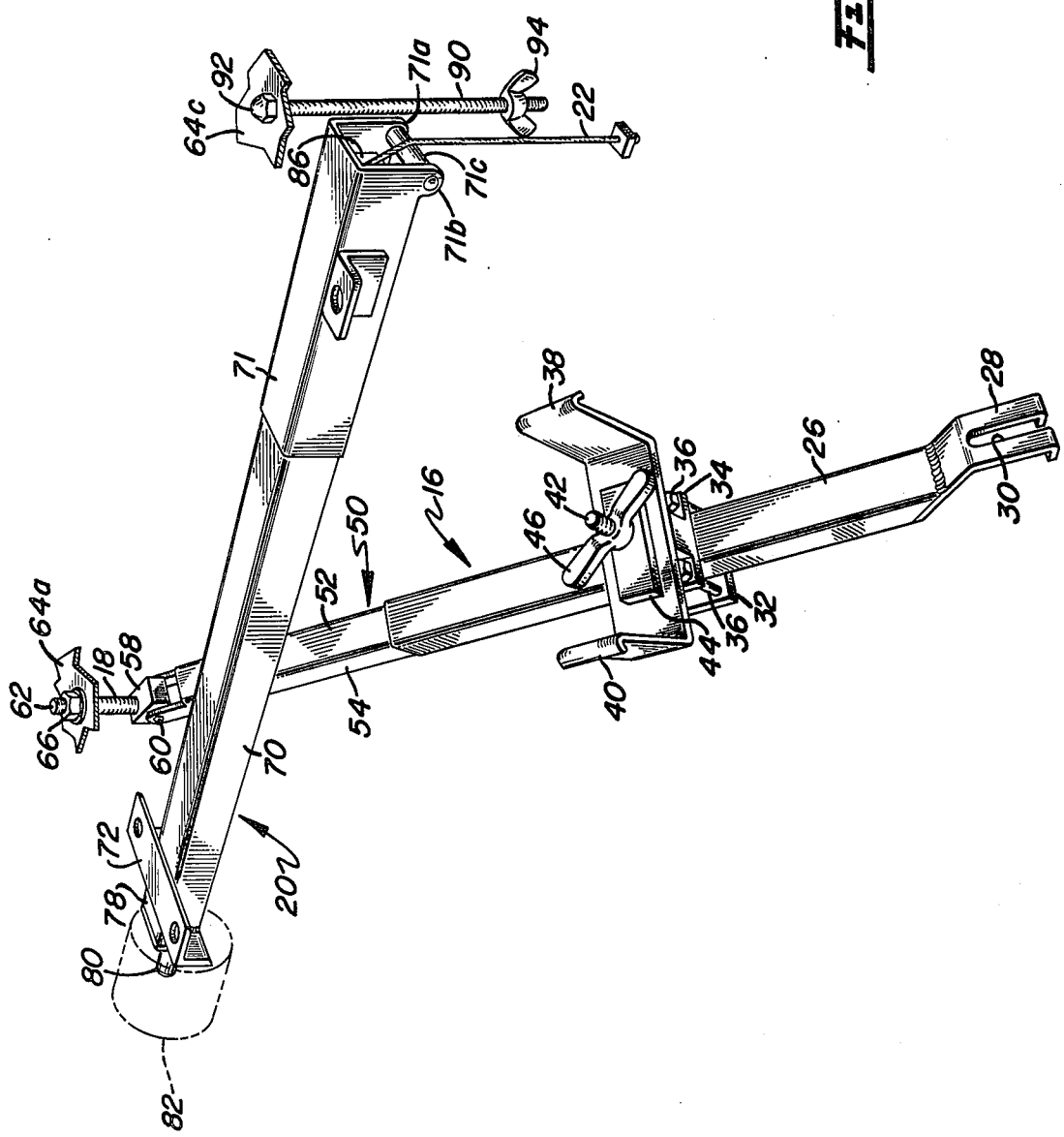
FIG. 5 is a perspective view of the invention.

The invention provides an apparatus for hoisting and storing a spare tire beneath the body of the vehicle. The apparatus comprises a supporting bar that is preferably hollow to which the tire is fastened. The supporting bar is operatively associated with the vehicle by means of a pivotal connection with the vehicle at the forward end of the bar. In a preferred form of the invention, the bar is slidable with respect to a channel member which is pivotally connected at its forward end to the vehicle for pivotal movement about both vertical and horizontal axes. A reel or other raising or lowering means is provided with an elongated flexible connecting element such as a cable, rope or chain wound upon it and extending downwardly with a provision for connecting its free end when desired to the free end of the tire supporting bar so that rotation of the reel or the extension or retraction of the raising or lowering means will raise and lower the connecting element thereby raising and lowering the rearward end of the tire support bar and the tire as the bar swings about the horizontal pivot. The supporting bar is entirely removable from the vehicle by means of a telescopic or sliding connection to enable the tire to be easily fastened to the support bar. The preferred support bar is a hollow polygonal tube slidably mounted over the channel which is self cleaning and with a polygonal support element cooperates with the reel and fastener at the free end of the rectangular support bar to hold the tire securely in position when stored and will keep the tire and its supporting member from turning on the axis of the supporting member while it is being placed in storage or removed from storage.

DESCRIPTION OF THE PREFERRED EMBODIMENT

The tire hoist and support designated generally by the numeral 10 in FIG. 1 is secured beneath the rear portion of a vehicle 12 such as an automobile or pickup truck, the latter being illustrated in the figures, for the purpose of supporting a spare tire 14 beneath the body or the truck bed as the case may be of the vehicle 12. The tire 14 during storage is secured to an elongated normally horizontally disposed tire support element indicated generally by the numeral 16 which is operatively associated at its forward end with a fixed mounting element such as vertically disposed threaded pin 18 that is secured rigidly to the vehicle. The free end of the elongated tire support element 16 is in turn connected when desired to a tire raising and lowering means 20 including an elongated flexible connecting element such as a rope, chain or in this case, a cable 22 that is connected at its lower end to the rearward end of the tire support element 16 for raising and lowering the tire.

The tire support element 16 comprises a hollow tire support bar or tube which is rectangular in cross section and is provided with a rectangular longitudinally extending hollow passage through it. A tongue 28 is secured in any suitable way as by welding to the free end of the tube 26 and is provided with a longitudinally extending slot 30 at its extreme end. A pair of transversely extending tire guide plates 32 and 34 are rigidly affixed to the tube 26 near its center by means of four bolts 36 with the upper tire guide member 34 in either the transverse position shown or if desired, extending parallel to and longitudinally of the tube 26. The position shown will, however, provide the greatest support for the tire 14. The ends 38, 40 of the guide 34 are suitably contoured as shown in FIG. 3 to fit the rim of the tire. Extending upwardly from the upper surface of the guide 34 is a threaded pin 42 upon which a tire support clamp 44 is held by means of a wing nut 46 threaded upon pin 42 to thereby hold the tire 14 securely in place as shown in FIGS. 2 and 3. When the tire is removed, the wing nut 46 and element 44 are removed. The tire 14 is then free to be taken off the tube 26 and guide member 34.

The tube 26 as clearly shown in FIGS. 2 and 3 is slidably and telescopically mounted upon an elongated channel element 50 having a center wall 52, a pair of parallel side walls 54 and 56 and being open at the bottom. The forward or uppermost end of the channel 50 is secured to the mounting element 18 by the provision of a threaded hangar block 58 having a horizontally disposed pivot pin 60 which extends through the forward end of the channel 50 to serve as a horizontally disposed pivot allows the rearward end of the bar 26 to swing up or down while the threaded connection between the hangar block and the threaded pin 18 allows the elongated tire support element comprising channel 50 and the bar 26 to swing from side to side about the vertical axis at the center of the pin 18. The pin preferably has a relatively coarse thread such as an Acme thread. The tube 26 is free to slide rearwardly off the end of the channel 50 when desired. The pin 18 is provided with a threaded extension 62 of a reduced diameter which is secured rigidly to the vehicle frame member 64a by the provision of a retaining nut 66. As seen in FIG. 3, other portions of the vehicle frame are designated 64b and 64c.

The means for elevating and lowering the tire will now be described with particular reference to FIGS. 2 and 3.

The elevating and lowering means comprising a screw lift composed of a housing or frame member 70 formed from an elongated channel to the left end of which is secured a hangar bracket 72 that is affixed to the vehicle, by means of bolts 74 and 76. Rigidly affixed to the right end of housing 70 by welding is a downwardly opening channel member 71 having a lateral flange that is in turn fastened to the vehicle by means of a bolt 73 (FIG. 3). The channel member 71 is provided with vertically disposed parallel walls 71a and 71b between which a cable supporting roller 71c is mounted for free rotation. Extending longitudinally within the housing 70 is a threaded shaft 80. Its left end is journaled for rotation within a low friction bearing 78 secured to housing 70. The extreme left end of the shaft 80 extends to the left beyond the bearing 78 and depending upon the application of the invention is suitably coupled in any well-known and conventional way to an electric drive motor 82 or in the alternative to a hand crank 84 (FIG. 3) the latter being preferred where the installation is to be made on smaller vehicles or where low cost is an important factor. Mounted upon the shaft 80 is an internally threaded pull block 86 to which the upper end of the cable 22 is secured in any suitable way so that as the crank 84 or motor 82 turns the threaded shaft 80, the pull block will move either toward the right or left in FIG. 3 thereby either lowering or elevating the free end of the tire support bar 26 and tire as the bar 26 and channel 50 swing about the horizontal pivot 60. As shown in FIG. 2, the cable 22 passes over the roll 71c to reduce friction.

As shown in FIG. 4, there is provided a fastener such as a hangar bolt 90 extending through frame member 64c and having an enlarged head 92 abutting the upper surface of the frame member 64c to hold the bolt in place. A wing nut 94 is provided on the lower end of the bolt 90 so that when the cable 22 has elevated the tire support and tire 14 to the storage position shown in FIGS. 3 and 4, the bolt can be placed in slot 30 and the wing nut tightened to securely hold the tire in place.

In a modified form of the invention, the screw lift comprising the housing 70 and the threaded shaft 80 with its electric motor 82 or crank handle 84 are eliminated and replaced with an electrically operated cable winch 100 which is suitably affixed for example by means of bolts (not shown) to the frame member 64c with the cable 22 being connected directly to it. Any suitable commercially available winch 100 of the proper capacity can be employed. The winch 100 can also be thought of as an elevating means for raising and lowering the cable and the free end of the tire support element.

The manner in which the tire hoist and support is used will now be described.

It will be assumed first that the threaded hangar block has been turned up or down on the stationary threaded pin 18 to the proper position to secure the tire 14 tightly in place when the tongue 28 and the support tube 26 are in the raised position. This can be easily accomplished merely by turning the threaded hangar block a few times around on the pin 18.

To mount the tire 14, the tube 26 is first completely removed from channel 52 and is usually most conveniently secured to the tire by leaning the tire against the side of the vehicle and then fastening the tube 26 (now completely separate from the vehicle) to the tire by the retaining element 44 and the wing nut 46. The tire is then placed behind the vehicle or to one side if desired with the tube 26 lowermost. The end of the tube 26 opposite tongue 28 is then placed over the end of the channel and slid toward the pin 18 a short distance. The free end of the cable 22 is then secured within the slot 30 and the screw lift 20 or the winch 100 as the case may be is operated to elevate the cable 22 and the rearward free end of the tire support as the latter swings upwardly about the horizontal pivot 60 while at the same time the hangar block pivots about a vertical axis comprising the center of pin 18 unless the tongue 18 was initially located exactly vertically beneath the bolt 90. At the same time, the tube 26 may slide forwardly somewhat onto the channel 52 if not completely collapsed before the cable was attached. As can be seen, the horizontal pivot pin 60 cooperating with the U-shaped channel and rectangular tube 26 functions as a means for preventing tire 14 at all times from rotating or tilting as it is being stored or withdrawn from storage thereby enabling the operation to proceed quickly and efficiently. Once the tongue 28 has reached its uppermost position, the bolt 90 is introduced into slot 30 and the wing nut is tightened. The reverse operations are performed to remove the spare tire 14.

From the foregoing it can be seen that the present invention provides a low cost and rugged tire hoist which allows the tire to be raised and lowered with very little physical effort. Moreover, the tire 14 and its supporting bar will not wobble or tilt about its longitudinal axis. The tire supporting bar can be entirely removed from the vehicle for easy mounting on the tire and the free end thereof can be raised and lowered by any suitable elevating means such as a screw lift, winch or the like coupled to an elongated flexible connecting element such as cable 22. It should also be noted that it is unnecessary to place the tire directly under the vehicle or drive the vehicle over the tire in order for the tire to be mounted on the hoist. Additionally, the tube 26 which can be open at both ends cooperates with a downwardly opening channel 50 to provide a self cleaning action and reduce the chance of it becoming stuck. The device, moreover allows straight out-side or rear delivery of the spare tire.

What is claimed is:

1. An apparatus for hoisting and storing a spare tire beneath the body of a vehicle comprising,
   a. an elongated support bar adapted to be mounted normally in a horizontal disposed position beneath the body of the vehicle, said supporting bar having a connected end and a free end,
   b. a vertically disposed threaded mounting pin rigidly connected to the vehicle at one end and attached at the other end to the connected end of the supporting bar,
   c. a threaded hangar block screw threaded upon the pin whereby the hangar block can be raised or lowered upon the pin by being turned thereupon to thereby raise or lower the connected end of the elongated tire supporting bar to accomodate tires of different sizes and the screw thread connection between the pin and the hangar block functions as a vertical pivot axis at the forward end of the elongated tire support bar to allow the free end thereof to swing freely from side to side about the vertical axis of the pin at the forward end of the bar for rear or side delivery of the tire as the tire is being removed or replaced beneath the vehicle,
   d. a horizontally disposed pivot operatively associated between the connected end of the bar and the threaded hangar block allowing the free end of the bar to swing upwardly and downwardly about the pivot,
   e. preventor means is provided for preventing rotation of the elongated tire supporting bar and the tire mounted thereon upon its own longitudinal central axis to keep the tire from tilting as it is being placed into or removed from the storage position beneath the vehicle,
   f. said preventor comprising forming the bar from an elongated polyagonal tube slidably mounted upon an elongated channel element, one end of the elongated channel element extending from the end of the tube and being operatively connected to the vehicle by means of the horizontally disposed pivot whereby the channel and tube slidably mounted thereupon are free to swing up or down about said pivot and the horizontal pivot cooperating with the channel and tube is adapted to prevent the tube and tire mounted thereupon from rotating about the central longitudinal axis of the tube,
   g. a tire mounting means secured to the tube between the connected and free ends thereof for fastening a tire to the tube,
   h. a tire elevating means secured to the vehicle and operably associated with the free end of the tube, said elevating means including an elongated flexible connecting member having an end adapted to be fastened to the free end of the tube,
   i. a screw lift including a housing, a shaft mounted for rotation therein, a means for rotating the shaft, a pull block connected to the shaft and connected to the upper end of the elongated connecting element so that the rotation of the shaft is adapted to move and pull block toward one end or the other of the screw lift to thereby raise or lower the elongated connecting element and the free end of the tire supporting tube to thereby lower the free end of the tube or raise it together with the tire to the storage position wherein the tire assumes a substantially horizontal position beneath the vehicle.

2. The apparatus of claim 1 wherein the means for turning the threaded shaft comprises a hand operated crank.

3. The apparatus of claim 1 wherein a means for turning the threaded shaft comprises an electric motor.

* * * * *